Aug. 27, 1968      A. RESZKA      3,399,351
SEQUENCE DETECTION CIRCUIT
Filed April 7, 1966
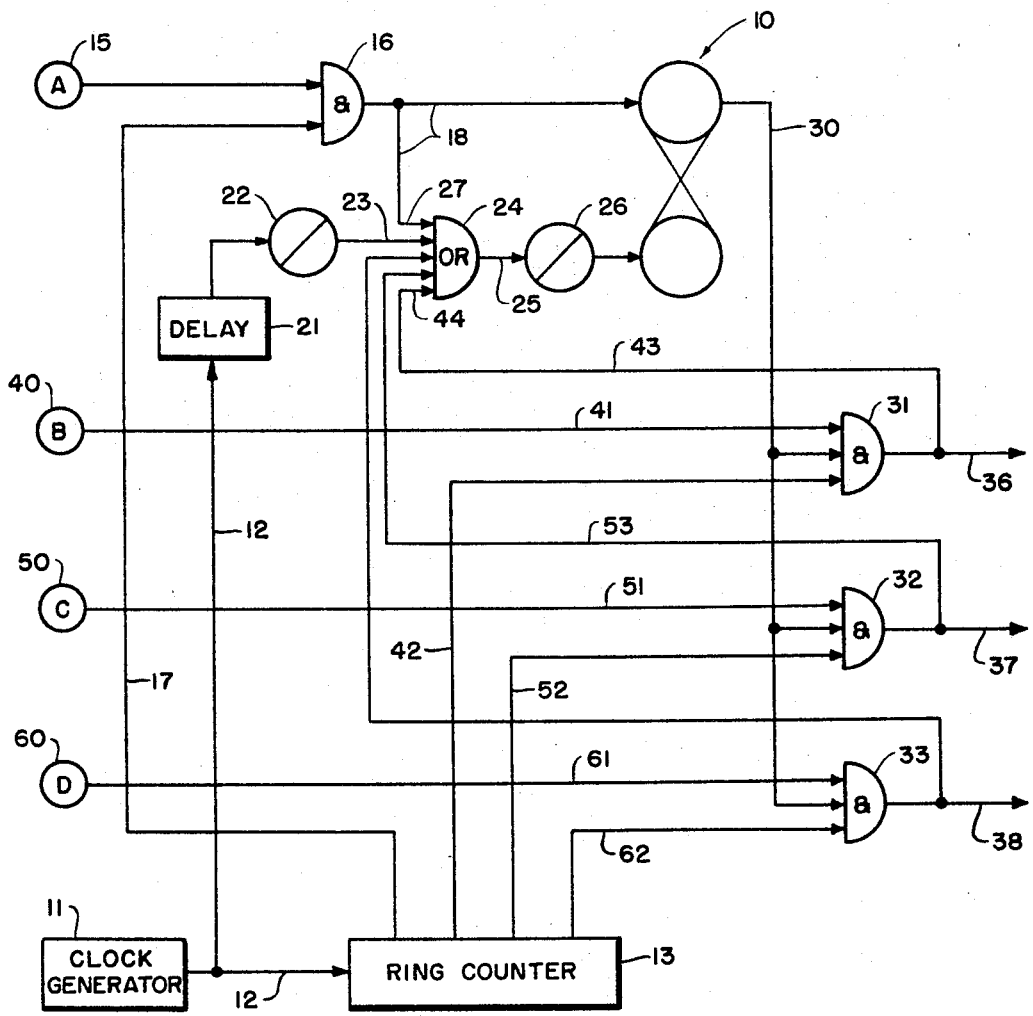
INVENTOR
ALFONS RESZKA
BY *R. C. Terry*
ATTORNEY

United States Patent Office 3,399,351
Patented Aug. 27, 1968

3,399,351
SEQUENCE DETECTION CIRCUIT
Alfons Reszka, Northbrook, Ill., assignor to Teletype Corporation, Skokie, Ill., a corporation of Delaware
Filed Apr. 7, 1966, Ser. No. 540,921
9 Claims. (Cl. 328—119)

ABSTRACT OF THE DISCLOSURE

A circuit for detecting a plurality of signals occurring in a predetermined sequence using a single bistable memory element set to one of its two states upon receipt of the first signal in the sequence. During each time interval in which succeeding signals of the sequence should occur, a reset pulse is supplied for resetting the memory element to its other state; but the reset pulses are inhibited by receipt of the expected signals in the proper sequence.

---

Heretofore, sequence detection circuits have been used for detecting a plurality of signals occurring in a predetermined sequence by remembering the reception of each individual signal as it occurs in the sequence. This requires that a separate memory device be employed for each signal in the sequence to be recognized, resulting in costly, cumbersome circuits.

Therefore, it is an object of the present invention to detect a sequence of signals with a minimum number of memory elements.

It is another object of the present invention to detect a sequence of signals using only a single memory element.

It is a further object of the present invention to detect the occurrence of a plurality of signals in a predetermined sequence by remembering that the sequence has not been broken.

In accordance with the preferred embodiment of the invention for use in recognizing signals from different sources occurring in a predetermined sequence, a single memory element is set to the "1" state upon receipt of the first signal in the sequence. Upon receipt of the second and succeeding signals in the sequence, attempts are made to reset the memory element to the "0" state, but these attempts are inhibited by receipt of the expected signals in the proper sequence.

A more complete understanding of the invention may be had from the following detailed description when considered in conjunction with the accompanying drawing which shows a preferred embodiment of the invention.

The drawing shows a circuit having a recognition gate for each signal in the sequence and a single bistable multivibrator (flip-flop) 10 as a memory element. Since this circuit is binary in its operation, all signals are either "1" state (a given voltage level) or "0" state (a different voltage level). A clock generator 11 normally having a "0" state output generates a "1" state clock pulse of short duration each time that a signal is to be received, and supplies this "1" state clock pulse to a ring counter 13 which provides distributed timing signals to various parts of the circuit. All signal sources normally supply "0" state signals; but when a "1" state signal is available from the first signal source 15, it is applied to an AND-gate 16. Shortly after this first "1" state signal arrives at AND-gate 16, a "1" state clock pulse of short duration issues from clock generator 11 and sets ring counter 13 to its first position wherein a "0" state signal is supplied to all of the outputs of ring counter 13 except for a "1" state that is supplied on conductor 17 to the other input of AND-gate 16. Therefore, a "1" state exists on output conductor 18 from AND-gate 16 and sets bistable multivibrator 10 to the "1" state.

The first clock pulse from clock generator 11 also passes over another branch of conductor 12 to a delay 21 which delays the "1" state clock pulse by a sufficient amount to permit AND-gate 16 to provide a "1" state on conductor 18. The output of delay 21 is inverted in an inverter 22 to provide a "0" state reset pulse of short duration to an input conductor 23 of an OR-gate 24. OR-gate 24 is arranged to issue a "1" state output on its output conductor 25 when any of its inputs are in the "1" state, and a "0" state signal is applied to conductor 25 whenever all of the inputs of OR-gate 24 are in the "0" state. When conductor 25 carries a "0" state output from OR-gate 24 to an inverter 26, the inverter 26 inverts this "0" state signal into a "1" state signal which resets flip-flop 10 to the "0" state. Occurrence of the first "1" state signal at signal source 15 at the proper time assures a "1" state condition on wire 18 connected to the top input 27 of OR-gate 24. This causes OR-gate 24 to issue a "1" state signal on conductor 25 when the "0" state reset pulse from delay 21 and inverter 22 is applied to input conductor 23 of OR-gate 24. Since conductor 25 carries a "1" state signal, inverter 26 supplies a "0" state signal to flip-flop 10, and flip-flop 10 remains in the "1" state. It can be seen that OR-gate 24 functions as an inhibit gate, inhibiting the resetting of flip-flop 10 by the reset pulse on conductor 23 when any other input to OR-gate 24 is in the "1" state.

It also can be seen that if the first "1" state signal does not issue from signal source 15 when a "1" state sample signal is available on sample conductor 17, a "1" state does not appear on output conductor 18. Flip-flop 10 therefore remains in the "0" state.

When bistable multivibrator 10 is in the "1" state it supplies a "1" state signal over an output conductor 30 to the center input of each of three AND-gates 31, 32 and 33. Each of these AND-gates is arranged to issue a "1" state signal on its output conductor 36, 37 or 38 when all three of its inputs are in the "1" state.

If the second "1" state signal in the sequence is present at signal source 40 after successful receipt of the first signal from signal source 15, the "1" state present at signal source 40 provides a "1" state on conductor 41 to the top input of AND-gate 31. Shortly thereafter, a short, "1" state clock pulse issues from clock generator 11 and is supplied to delay 21 and to ring counter 13 causing a "1" state to be applied to sample conductor 42 which provides a "1" state signal to the bottom input to AND-gate 31. Since all three of the inputs of AND-gate 31 are now in the "1" state, the output of AND-gate 31 appearing on conductor 36 is in the "1" state indicating that the second signal of the sequence properly followed the first signal. This "1" state signal is carried over conductor 43 to input 44 of OR-gate 24 assuring that at least one of the inputs to OR-gate 24 is in the "1" state at the time the reset pulse is applied to input 23 of OR-gate 24. Therefore, OR-gate 24 continues to issue a "1" state signal at its output 25.

If signal source 40 fails to issue a "1" state signal on conductor 41 when sample conductor 42 carries a "1" state signal, AND-gate 31 issues a "0" state signal on conductor 43 because one of its three inputs is not a "1". All of the inputs to OR-gate 24 are then in the "0" state when the reset pulse is applied to OR-gate 24. If all five inputs to OR-gate 24 are thus in the "0" state, OR-gate 24 issues a "0" state signal at its output 25. This "0" state signal is inverted in inverter 26 to a "1" state and resets flip-flop 10 to the "0" state, indicating that the desired sequence has been broken.

If the first two signals issue from signal source 15 and signal source 40 at the proper times, bistable multivibrator 10 is still in the "1" state and delivers this "1" state signal over conductor 30 to the center input of AND-gate 32. If the next signal in the sequence appears at signal source 50, it provides a "1" state on conductor 51 to the top input of AND-gate 32. Shortly thereafter, a clock pulse issues from clock generator 11 to advance ring counter 13 so that a "1" state is carried on sample conductor 52 to AND-gate 32. Thus, AND-gate 32 now has "1" state signals on all three of its inputs and, therefore, supplies a "1" state signal on its output conductor 37. This "1" state signal is carried over conductor 53 to OR-gate 24 to prevent the reset pulse from resetting flip-flop 10 to the "0" state.

When the next signal is available at signal source 60, a "1" state signal is carried over conductor 61 to AND-gate 33. The next clock pulse from clock generator 11 advances ring counter 13 to its next stage applying a "1" state signal to sample conductor 62. If flip-flop 10 is still in the "1" state, the simultaneous application of three "1" state signals to AND-gate 33 causes AND-gate 33 to issue a "1" state signal on its output conductor 38. This "1" state signal on output conductor 38 is carried by conductor 63 to OR-gate 24 to prevent again the reset pulse from delay 21 from passing through OR-gate 24. This keeps flip-flop 10 in the "1" state.

The exact times that "1" state signals are available at signal sources 15, 40, 50, and 60 are not important, nor are the durations of these signals. They need only be in the "1" state when the reset pulse is available from inverter 22.

The signals from sources 15, 40, 50, and 60 preferably can be obtained from character-decoding AND-gates that are wired to monitor the coded signals received from a telegraph line. In this way, telegraphic character sequences can be used to initiate remote-control or "stunt" functions.

It is apparent that signals are available at outputs 36, 37 and 38 whenever the second, third, and fourth signals, respectively, of the predetermined sequence are available in their proper order. Therefore, it can also be seen that by simply adding extra stages to ring counter 13 and additional AND-gates similar to AND-gates 31, 32, and 33, a sequence of any number of signals can be recognized. A single ring counter 13 also can deliver the clock pulses for a large number of sequence-detection circuits similar to that shown, thereby imparting a high degree of simplicity to an extensive sequence-detection system for recognizing many multiple-signal sequences.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A circuit for detecting the receipt of a plurality of signals in a predetermined sequence comprising:
    means for remembering receipt of a first signal of the sequence;
    means for erasing the information stored in the remembering means; and
    means responsive to receipt of a second signal in the sequence for disabling the erasing means.

2. A circuit according to claim 1 wherein the remembering means comprises a bistable device having a "1" state and a "0" state wherein receipt of the first signal in the sequence causes the bistable device to be set to the "1" state.

3. A circuit according to claim 2 wherein the erasing means comprises means for resetting the bistable device to the "0" state.

4. A circuit according to claim 3 wherein the resetting means comprises:
    a source of pulses and a reset inhibit gate for passing pulses from the pulse source to the bistable device for resetting the bistable device to the "0" state, said inhibit gate having an input responsive to the disabling means for controlling the passing of pulses.

5. A circuit according to claim 4 wherein the disabling means comprises:
    an AND-gate having an output and a plurality of inputs, one input of which is energized by the second signal in the sequence; and
    a source of clock pulses having an output connected to a second input of the AND-gate for supplying a clock pulse thereto during receipt of the second signal in the sequence;
    the output of the AND-gate being connected to the input of the reset inhibit gate for providing an input thereto for preventing pulses from passing through the reset inhibit gate when the second signal in the sequence is received.

6. A circuit for detecting the receipt of a plurality of signals in a predetermined sequence including
    means responsive to receipt of a first signal in the sequence for providing a first output signal;
    means operating in synchronism with the received signals for resetting the output signal providing means to cause a second output signal to be provided therefrom; and
    means responsive to said first output signal and to receipt of successive signals in the predetermined sequence for disabling the resetting means.

7. A circuit according to claim 6 wherein the output signal providing means is a bistable device having first and second stable states providing said first and second output signals, respectively.

8. A circuit according to claim 6 wherein the resetting means includes a source of pulses for producing reset pulses in synchronism with the received signals.

9. A circuit according to claim 8 wherein the disabling means includes means for preventing pulses from the pulse source from reaching the output signal providing means.

References Cited

UNITED STATES PATENTS

| | | | |
|---|---|---|---|
| 2,984,789 | 5/1961 | O'Brien | 328—120 |
| 3,028,552 | 4/1962 | Hahs | 328—63 |
| 3,097,340 | 7/1963 | Dobbie | 328—63 |
| 3,189,835 | 6/1965 | Marsh | 328—63 |
| 3,287,650 | 11/1966 | Achramowicz | 328—63 |

JOHN S. HEYMAN, *Primary Examiner.*